(12) United States Patent
Klüting

(10) Patent No.: US 6,688,830 B2
(45) Date of Patent: Feb. 10, 2004

(54) CONNECTING DEVICE

(75) Inventor: Bernd Klüting, Radevormwald (DE)

(73) Assignee: Witte-Velbert GmbH & Co. KG, Velvert (DE)

( * ) Notice: Subject to any disclaimer, the term of this patent is extended or adjusted under 35 U.S.C. 154(b) by 0 days.

(21) Appl. No.: 09/980,569

(22) PCT Filed: Apr. 6, 2001

(86) PCT No.: PCT/EP01/03964

§ 371 (c)(1),
(2), (4) Date: Mar. 28, 2002

(87) PCT Pub. No.: WO01/77535

PCT Pub. Date: Oct. 18, 2001

(65) Prior Publication Data

US 2002/0176738 A1 Nov. 28, 2002

(30) Foreign Application Priority Data

Apr. 8, 2000 (DE) .......................................... 100 17 674
Apr. 5, 2001 (DE) .......................................... 101 17 851

(51) Int. Cl.⁷ ............................................... F16B 43/02
(52) U.S. Cl. ........................ 411/546; 411/547; 411/174; 411/125; 411/173
(58) Field of Search ................................. 411/546, 547, 411/535, 508, 913, 437, 433, 173, 174, 520, 525, 526, 528, 529, 125; 403/329, 326, 279–282

(56) References Cited

U.S. PATENT DOCUMENTS

| 2,896,495 | A | * | 7/1959 | Crawford | 411/437 |
| 3,027,670 | A | * | 4/1962 | Kramer et al. | 428/542.4 |
| 4,238,165 | A | * | 12/1980 | Wagner | 403/408.1 |
| 4,648,670 | A | * | 3/1987 | Punako et al. | 439/321 |
| 4,682,906 | A | | 7/1987 | Rückert et al. | |
| 4,934,861 | A | * | 6/1990 | Weeks et al. | 403/408.1 |
| 5,288,191 | A | * | 2/1994 | Ruckert et al. | 411/432 |
| 5,340,258 | A | * | 8/1994 | Simon | 411/535 |
| 5,895,189 | A | | 4/1999 | Rückert | |
| 6,062,763 | A | * | 5/2000 | Sirois et al. | 403/329 |
| 6,174,118 | B1 | * | 1/2001 | Rebers et al. | 411/352 |

FOREIGN PATENT DOCUMENTS

| DE | 2424575 | 12/1975 |
| DE | 3620005 | 9/1987 |
| DE | 4224575 | 3/1993 |
| DE | 4228625 | 3/1994 |
| DE | 4412431 | 10/1995 |
| DE | 19642446 | 6/2000 |
| EP | 0176663 | 4/1986 |
| EP | 0955479 | 11/1999 |
| EP | 1043507 | 10/2000 |
| JP | 5818107 | 7/1956 |

* cited by examiner

Primary Examiner—Flemming Saether
Assistant Examiner—Jori Schiffman
(74) Attorney, Agent, or Firm—Martin A. Farber

(57) ABSTRACT

A device f or the bracing connection of spaced-apart components (1, 2) by a connecting screw (5), comprising a supporting part (3), which can be secured on the first component (1) by fastening elements (8), and a spacer part (4), which can be displaced axially in relation to the supporting part (3) by rotation and, as the connecting screw (5), fitted into an opening of the spacer part, is screwed in, is carried along, as a result of friction-fitting engagement of the lateral surface of the screw shank against resilient elements (9) projecting into the opening, until it strikes against the second component (2) Both the supporting part (3) and the spacer part (4) are threaded bushings (6, 7) formed in one piece, the fastening elements (8) and the resilient elements (9) forming parts of the respective shaped member.

7 Claims, 8 Drawing Sheets

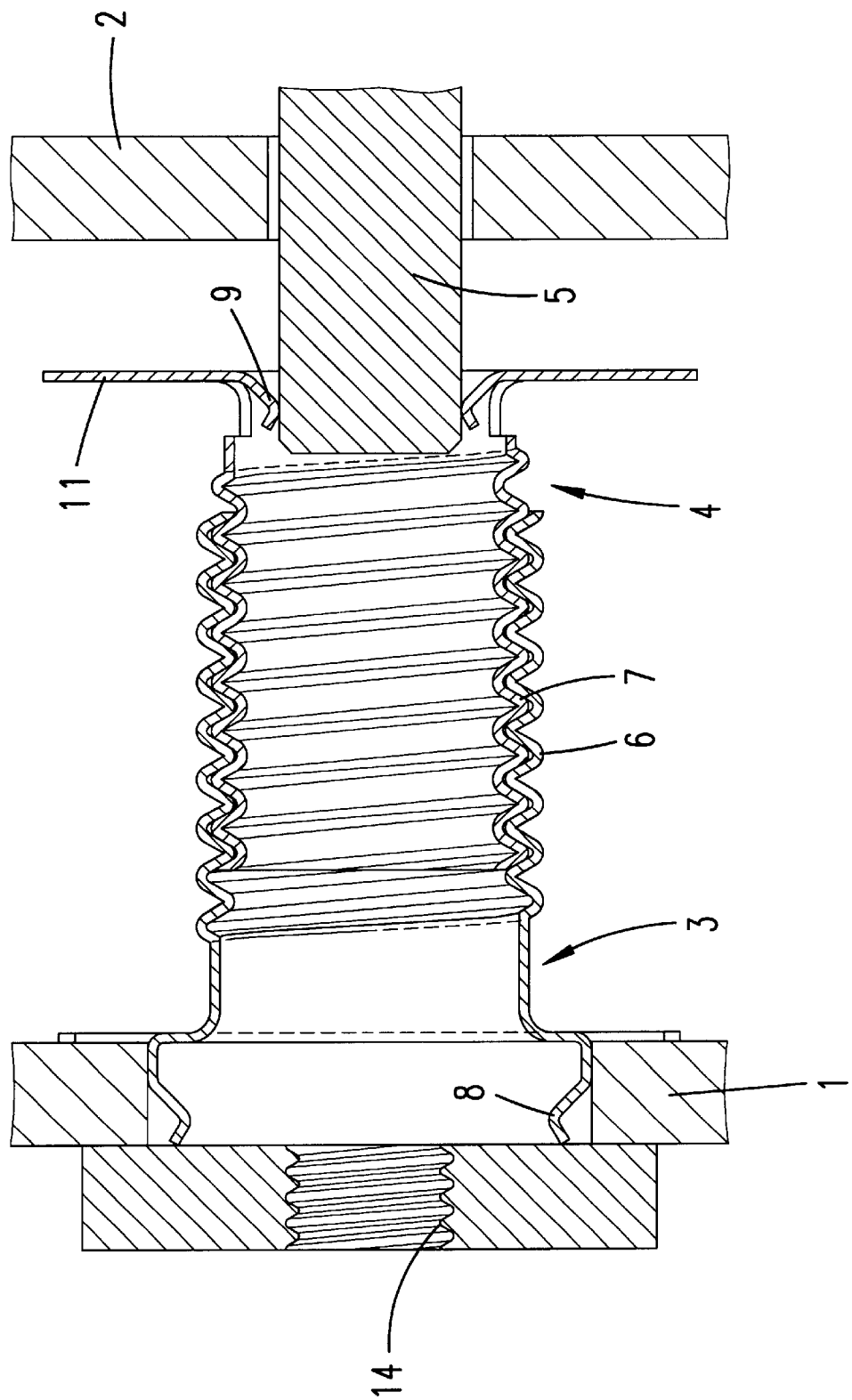

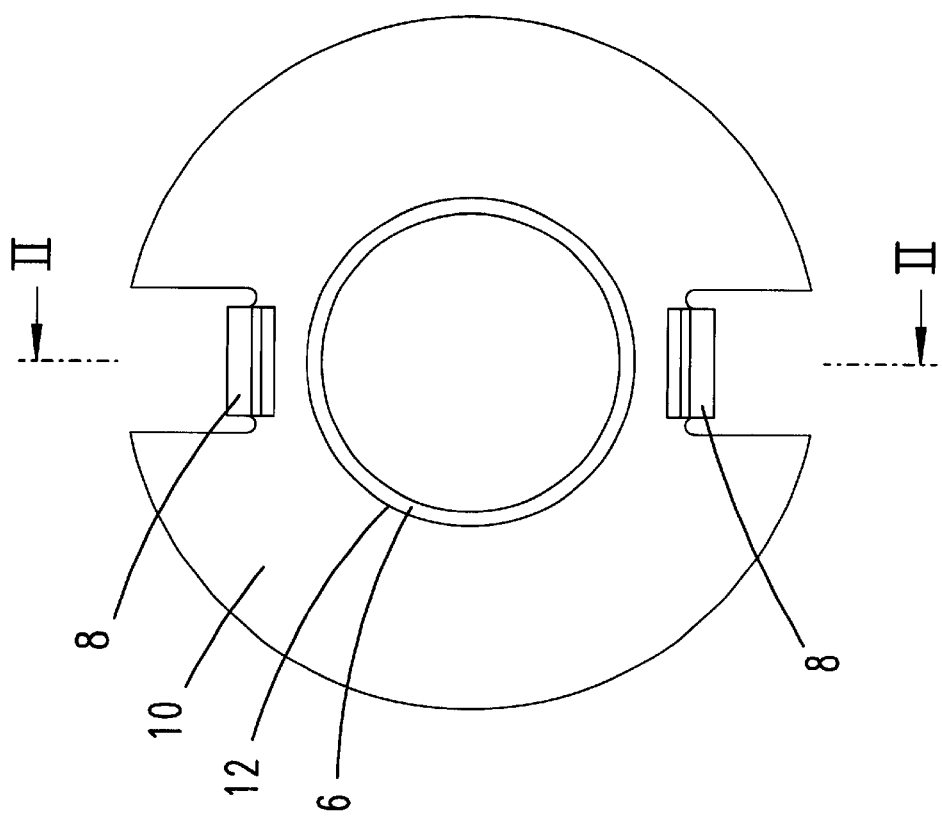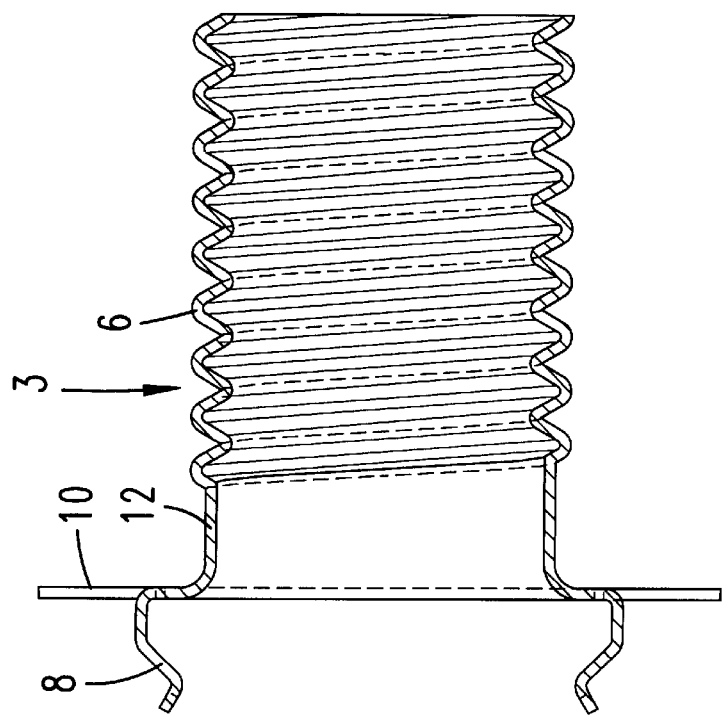

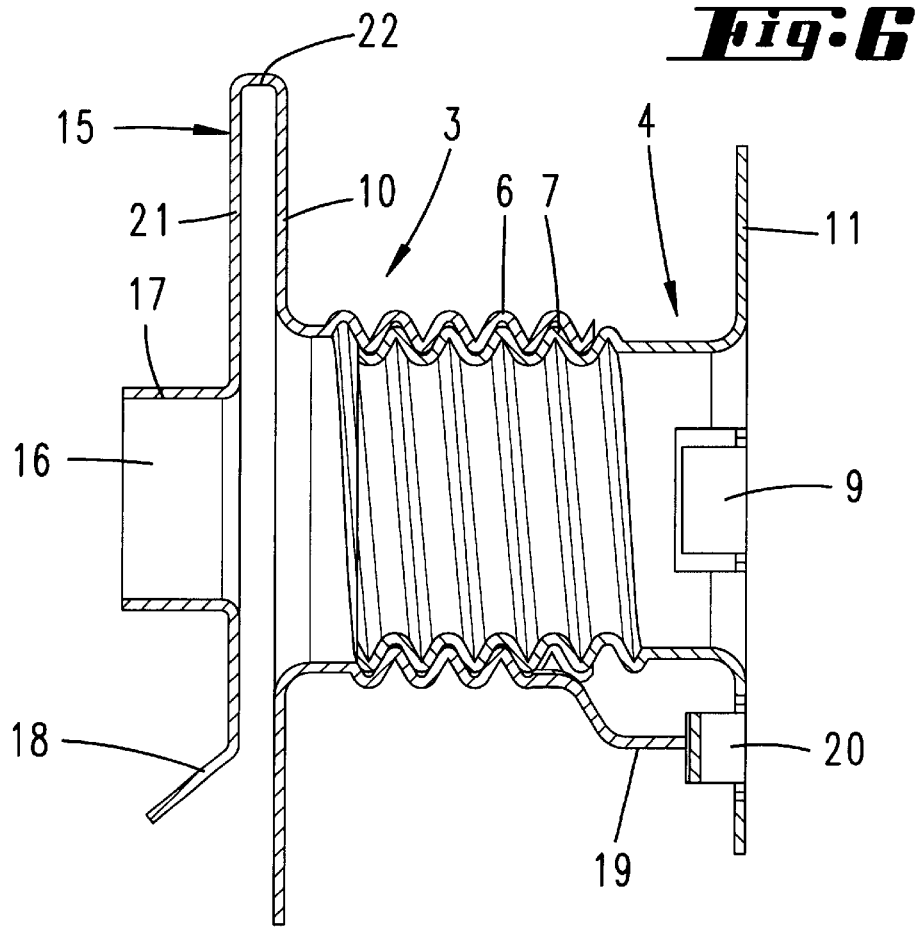
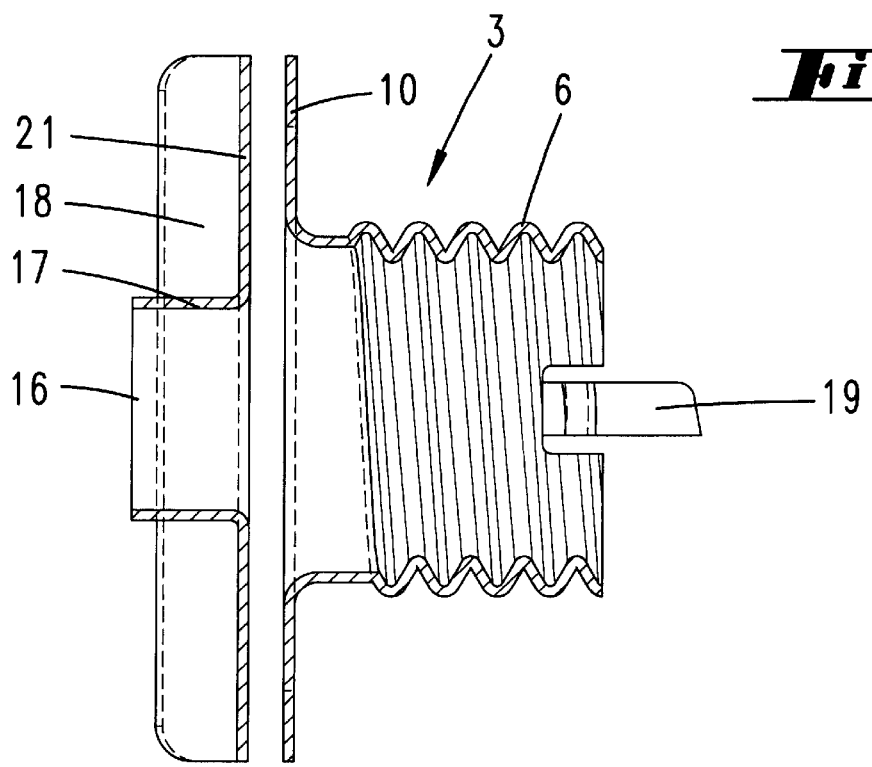

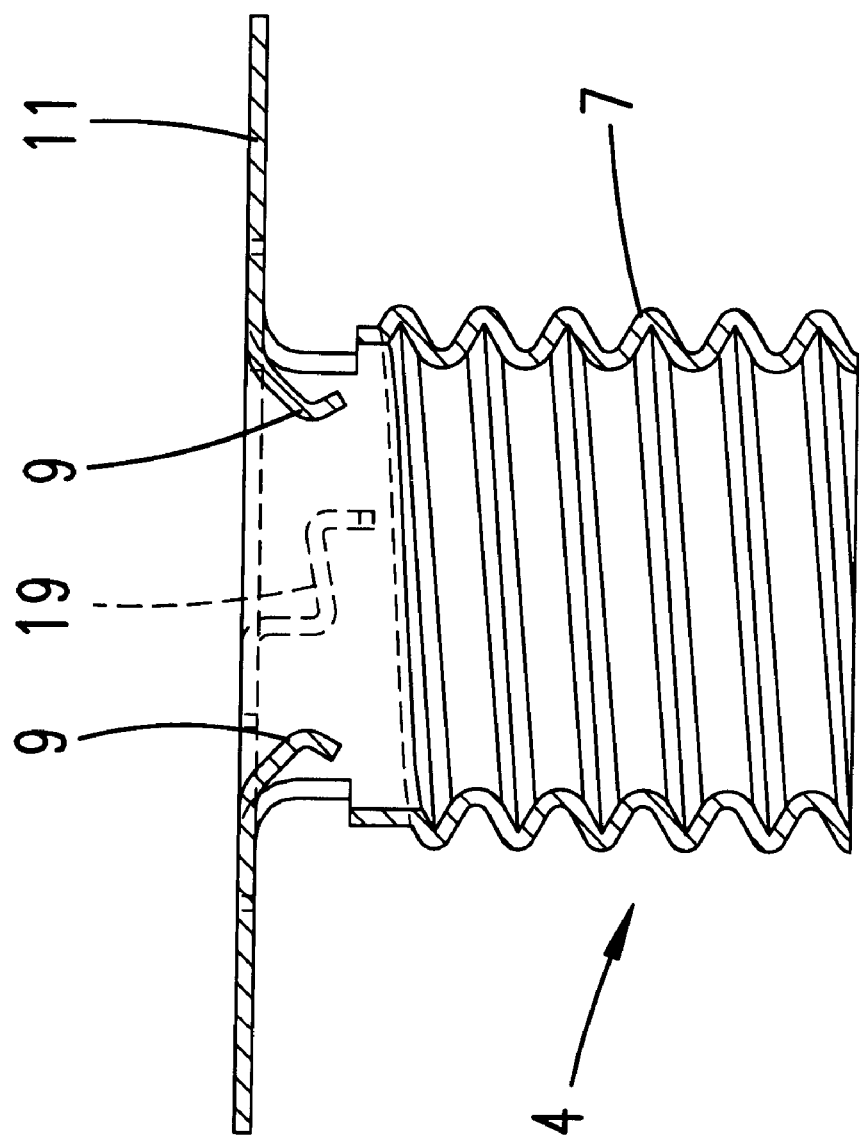

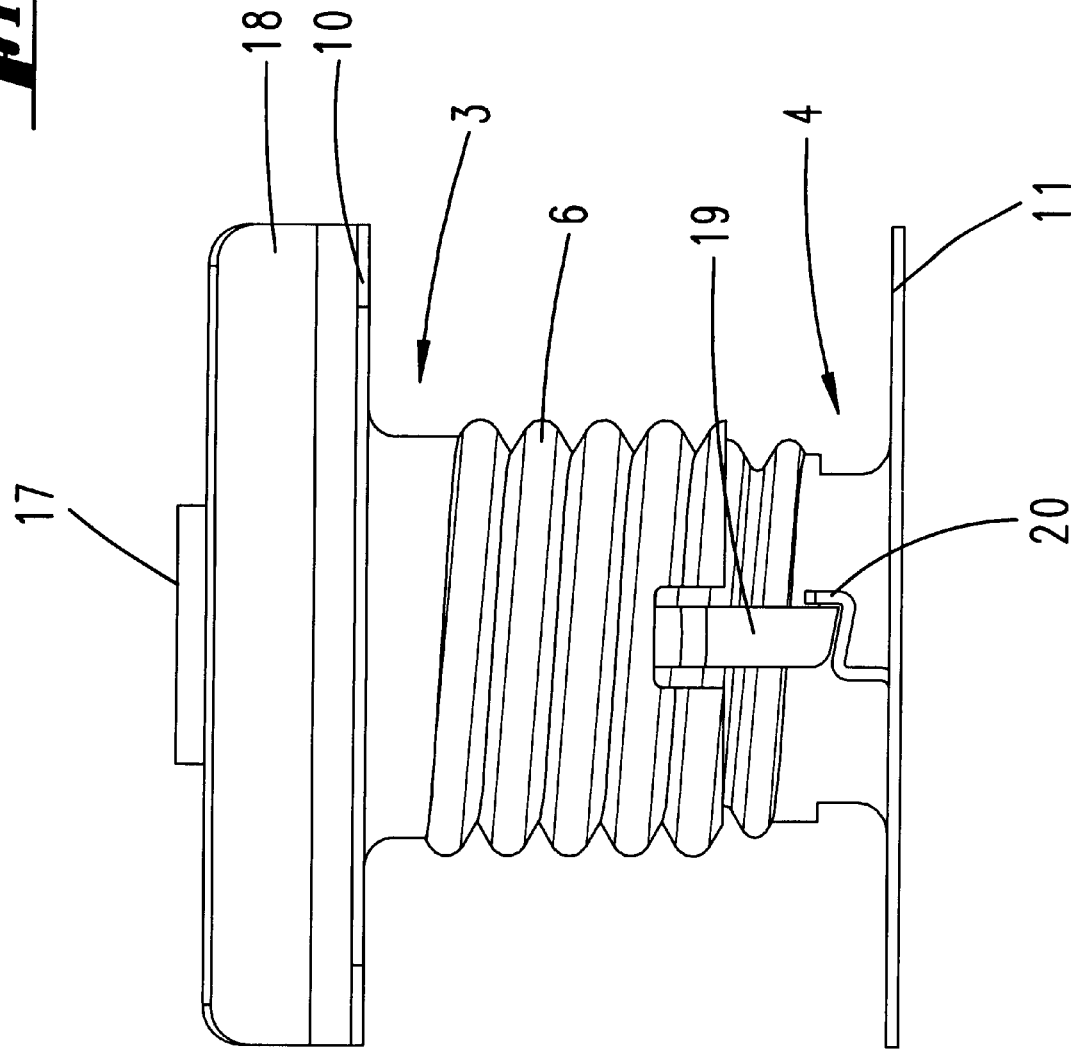

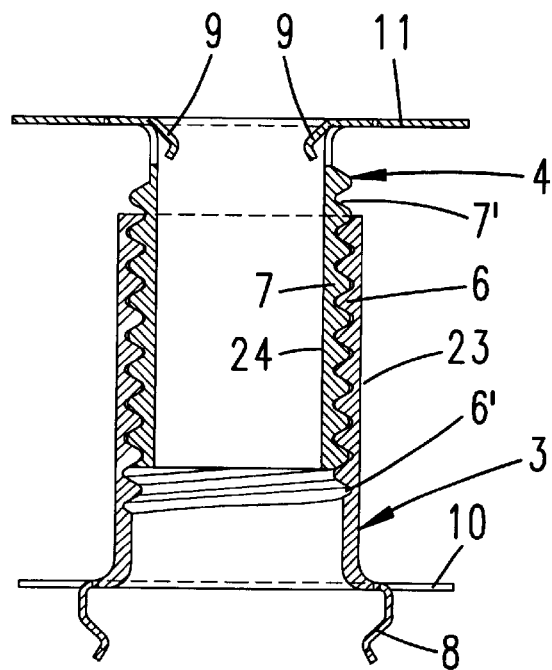
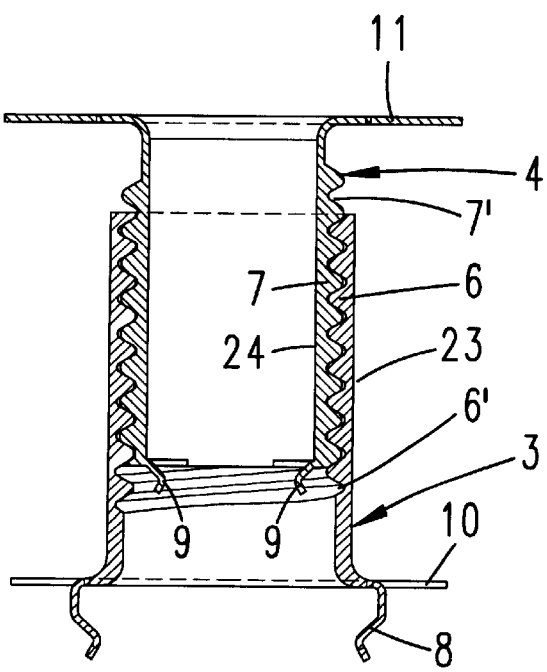
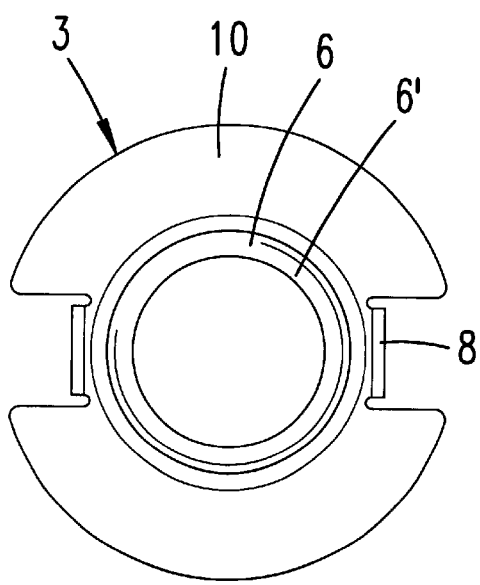
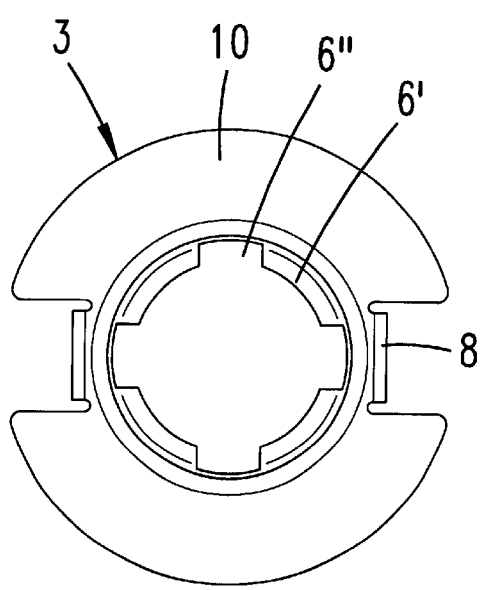

CONNECTING DEVICE

FIELD AND BACKGROUND OF THE INVENTION

Such connecting devices are known, for example, from EP 0 176 663, DE 4 224 575 A1, DE 36 20 005 C1 and DE 44 12 431 C1. The known connecting device has two parts, which comprise a plurality of individual components in particular made of different materials. These parts are connected to one another by a thread. One part forms a supporting part and can be connected to a first component. The second part, which forms the spacer part, is screwed to the support part by a left-handed thread and forms an end surface which is spaced apart from the second component. As the connecting screw is fitted into the spacer part, the resilient elements come into frictional engagement against the screw shank. If the screw is now rotated, then the spacer part moves with screwing action out of the supporting part because it is carried along with a friction fit by the screw shank. The supporting part moves with screwing action into the abutment position in relation to the second component. Thereafter, the frictional force by which resilient elements engage against the lateral surface of the screw shank is The invention relates to a device for the bracing connection of spaced-apart components by means of a connecting screw, comprising a supporting part, which can be secured on the first component by means of fastening elements, and a spacer part, which can be displaced axially in relation to the supporting part by virtue of rotation and, as the connecting screw, fitted into an opening of the spacer part, is screwed in, is carried along, as a result of friction-fitting engagement of the lateral surface of the screw shank against resilient elements projecting into the opening, until it strikes against the second component. less than the spacing force or the thread friction between the thread turns of the spacer part and supporting part, so that the screw can be screwed further through the opening of the two parts screwed one inside the other until it engages in the mating thread, associated with the first or the second component, in order to brace the two components with one another, these otherwise being supported against one another as a result of the two parts of the device moved into the spaced-apart position. A variant of the fastening is also possible, in which case the connecting screw may first of all be fitted through the opening of the two parts of the device until it reaches the mating thread. As the connecting screw is screwed into the mating thread, the two components of the device then move out with screwing action, carried along with a friction fit, until the spacer part passes into the abutment position in relation to the second component. Two variants are possible. In the first variant, the spacer part is displaced into the abutment position counter to the screwing-in direction. In the second variant, the spacer part is carried along with a friction fit by the screw rotation, in the same direction as the latter.

SUMMARY OF THE INVENTION

Accordingly the invention provides that both the supporting part and spacer part are formed in one piece as threaded bushings. In this case, they may consist of plastics or of metal. They may be produced by deep drawing. The device is now produced from two blanks. Both blanks are present as flat elements, in particular metal sheets. These are first of all deep drawn. The fastening elements and the resilient elements are each formed from the metal sheet, preferably by being cut out. The cutting out may take place before or after the deep drawing. In a preferred configuration of the invention, in each case one thread is formed on the walls of the threaded bushings. The leads and cross-sectional shapes of the turns of the threads are such that the two threaded bushings can be screwed one inside the other. It is preferable for the threaded bushing of the spacer part to be screwed into the threaded bushing of the supporting part. It has proven advantageous in production terms if the threads are rolled on. Both the supporting part and the spacer part preferably have, on a bushing border, an outwardly projecting annular collar. This annular collar forms the abutment surfaces by means of which, on the one hand, the support part and, on the other hand, the spacer part interact with the associated component, in particular can be fastened thereon. The fastening elements are tongues which are cut out of the annular collar preferably from the outside. These tongues project on that side of the annular collar which is located opposite the bushing, and can be clipped into a fastening opening. The resilient elements are cut out of an, in particular, thread-free bushing section adjacent to the annular collar. The flanks of the thread turns are preferably at an angle of 60° in relation to one another. In a development of the invention, it may be provided that the threaded sections of the two components are sheathed in plastics and/or lined with plastics. Furthermore, it is possible for the two parts, in particular formed from a single piece of material, the supporting part and spacer part, to consist entirely of sheet metal or of plastics. It may further be provided that the fastening element is formed as a clip. In this case, it is provided, in particular, that a counter plate runs parallel to the collar, the counter plate being connected integrally to the collar and forming a U-shaped angled portion. In alignment with the threaded bushings, this counter plate forms a through-passage opening for the connecting screw. It may further be provided that a stop lug is integrally formed on one of the two threaded bushings. This may likewise be in the form of a tongue. This stop lug, together with a counter stop of the other part, forms a rotary limit stop. The counter stop may be formed by a cut-out section of a collar.

It is further provided that the two threaded bushings are formed by injection moulding. The injection mouldings here have, in particular, annular collars. In a preferred configuration of the invention, the threaded bushings have smooth-walled surfaces on their side directed away from the threads. It may further be provided that the internal thread is interrupted in certain regions in the circumferential direction. It is preferably possible to provide four thread-free zones distributed uniformly over the circumference.

The invention advantageously comprises just two single-material parts, i.e. parts which are not themselves assembled from different elements. Each part is produced in a single piece.

BRIEF DESCRIPTION OF THE DRAWINGS

Exemplary embodiments of the invention are explained hereinbelow with reference to attached drawings, in which:

FIG. 1 shows a sectional illustration of a device according to the invention in the installed state, FIG. 2 shows a sectional illustration of the supporting part, FIG. 3 shows the supporting part in plan view on the annular collar, FIG. 6 shows the screwed-together sectional illustration of a second exemplary embodiment, FIG. 7 shows the supporting part of the second exemplary embodiment, FIG. 8 shows the spacer part of the second exemplary embodiment, FIG. 10 shows the second exemplary embodiment in side view, FIG. 11 shows a third exemplary embodiment of the invention, in which the two parts are produced as plastics injection mouldings, FIG. 12 shows the exemplary embodiment according to FIG. 11 in plan view on the supporting part, FIG. 13 shows an illustration like that of FIG. 12 for a variant, and FIG. 14 shows a further variant in an illustration according to FIG. 11.

DETAILED DESCRIPTION OF THE PREFERRED EMBODIMENT

Figure 4:
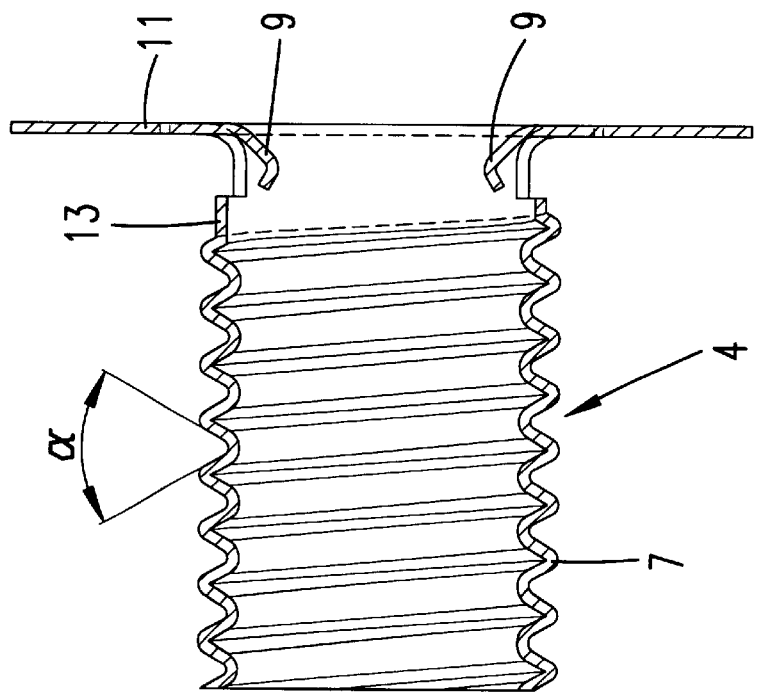
FIG. 4 shows the spacer part in longitudinal section.
Figure 5:
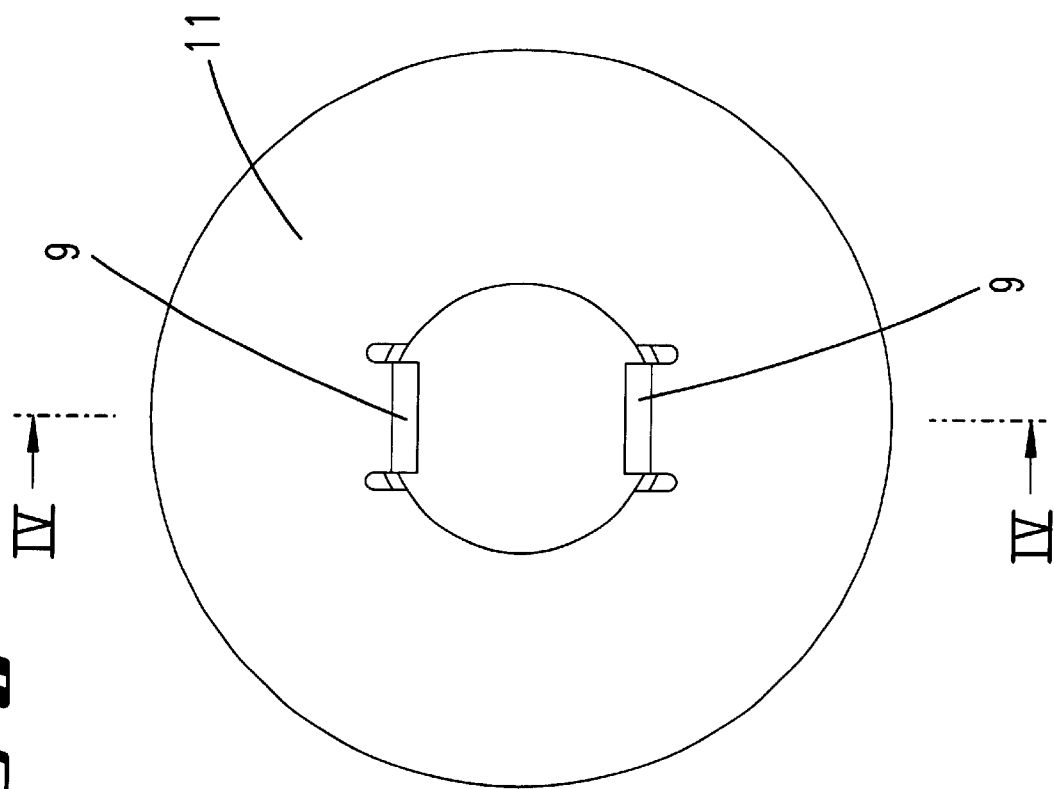
FIG. 5 shows the spacer part in plan view on the annular collar.

The device illustrated in the first exemplary embodiments comprises two shaped sheet-metal parts 3, 4. The supporting part, which is designated by reference numeral 3, in the same way as the spacer part, which is designated by reference numeral 4, is produced from a piece of sheet metal by deep drawing and subsequent shaping and cutting operations. It is preferably provided that first of all cutouts are punched into the piece of sheet metal, from which it is then possible for the fastening tongues and/or the resilient tongues to be bent out.

The threaded bushings 6, 7 are produced by deep drawing.

The supporting part 3 has an annular collar 10. Slots are introduced into this annular collar from the outside, and the fastening tongues 8 are cut out by means of these slots. These fastening tongues, which are located diametrically opposite one another, are bent transversely to the end surface of the annular collar 10. The bushing 6 extends on the opposite end side of the annular collar 10. The collar 10 is adjoined first of all by a thread-free section 12. A threaded bushing 6 extends from this thread-free section 12. The thread turns are spaced apart by 1.5 mm. The thread flanks assume an angle of approximately 60° in relation to one another. The vertices of the thread flanks are rounded.

The spacer part 4 likewise has an annular collar 11. The resilient tongues 9, cut out of a thread-free section 13, project radially inwards from this annular collar 11. These resilient tongues 9 are located diametrically opposite one another and have a clear extent between them which is less than the diameter of the threaded-shank section of the connecting screw 5.

The thread-free section 13, which adjoins the collar 11, is adjoined by a threaded section 7. This threaded section is also produced by rolling. Here, too, the thread lead is 1.5 mm. The flanks of the thread turns also have a flank angle of 60° here. The vertices of the thread turns are rounded such that the thread 7 can be screwed into the internal thread 6, as illustrated in FIG. 1.

Figure 9:
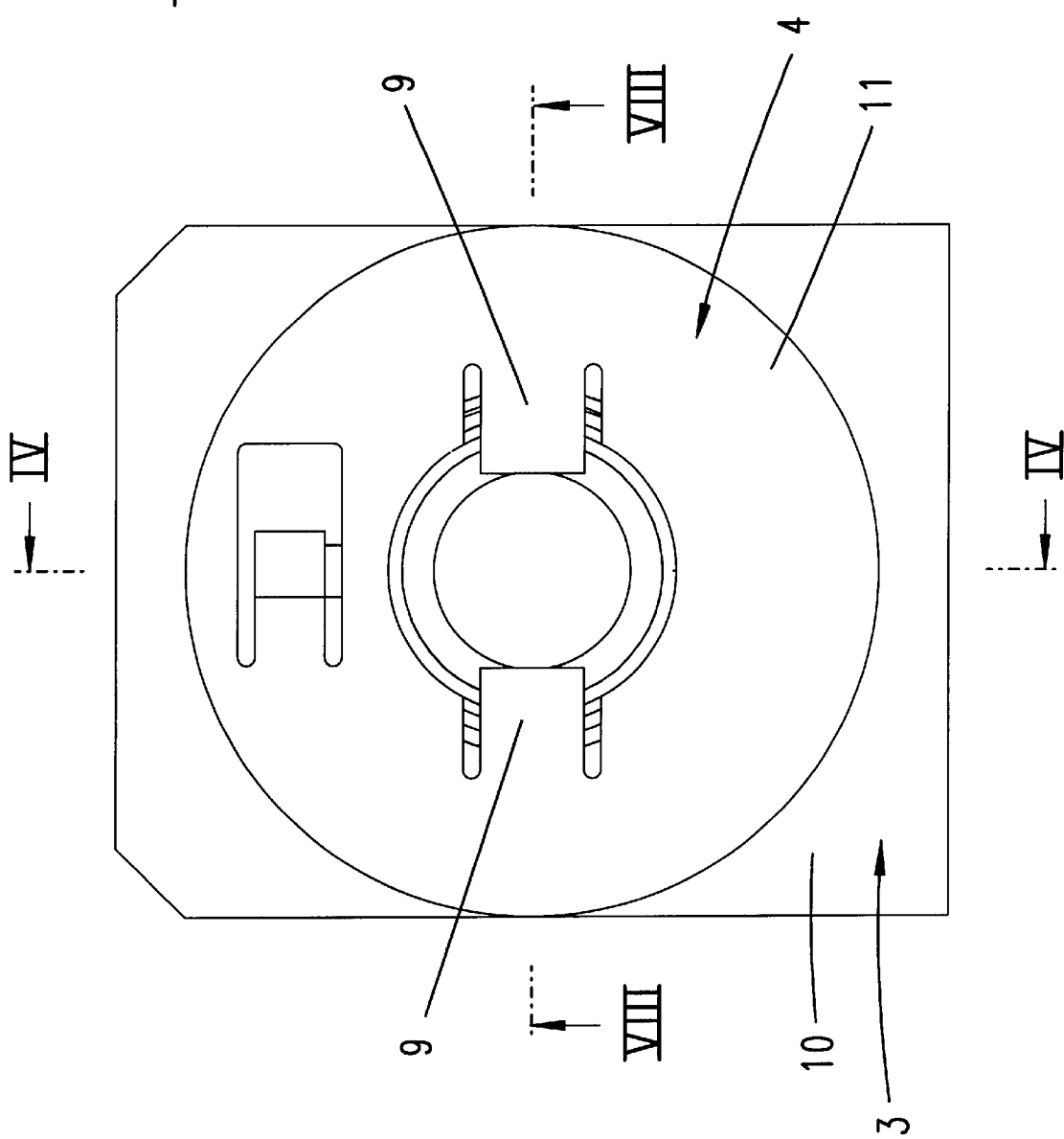
FIG. 9 shows a plan view on the collar of the spacer part.

In the exemplary embodiment illustrated in FIGS. 6 to 10, the fastening element has a modified configuration. In this case, the collar 10 has a rectangular outline. Extending parallel to the collar 10 is a counter plate 21, which is connected to the collar 10 via a connecting crosspiece 22. The collar 10, crosspiece 22 and counter plate 21 are made of the same piece of material and configured from a metal sheet bent in the form of a U, this forming a fastening clip 15 which can be pushed over an edge of a component. The component is then accommodated between the collar 10 and counter plate 21.

In alignment opposite the two threaded bushings 6, 7, the counter plate 21 forms a through-passage opening 16 for the screw. In the exemplary embodiment, this opening is provided with a neck 17. The neck 17 may carry a mating thread for the connecting screw 5.

As an extension formed from the same piece of material, the threaded bushing 6 forms a stop lug 19. The latter projects beyond the end edge of the threaded bushing 6 and is located in front of a counter stop 20, which is cut out, in the form of a tongue, of the collar 11 of the spacer part 4. As a result of the abutment of the stop lug 19 in front of the counter stop 20, the two parts 3, 4 are retained in a rotationally inhibited manner in their mounted position. In order for it to be possible for the spacer 4 to be rotated in relation to the supporting part 3, the stop lug 19 has to be moved over the counter stop 20. Since the counter stop 20 can yield resiliently, a small amount of force is necessary for this purpose.

The device functions as follows: in the basic state, the two threads 6, 7 are screwed fully one inside the other, so that the annular collars 10, 11 are in the position in which they are closest together. The stop lug 19 is located in front of the counter stop 20. In this state, the device is fitted in a mounting opening of a first component. Fixing takes place by means of the fastening tongues 8 in the opening wall or by means of clips 15 on a component edge. The component 2 is spaced apart from the component 1 by a distance which is greater than the distance between the two collars 10, 11. The threaded shank of a connecting screw 5 is then fitted through an opening of the component 2. The connecting screw 5 is fitted into the spacer part 4 until the thread comes up against the screwing-in thread 14. The resilient tongues here engage with a friction fit against the lateral surface of the threaded shank of the connecting screw 5.

If the connecting screw 5 is then rotated, the two left-handed threads 6, 7, which are screwed one inside the other, unscrew from one another, while the connecting screw 5, which is provided with a right-handed thread, screws into the screwing-in thread 14. As a result of the spacer part 4 being carried along with a friction fit as the connecting screw 5 is rotated, the collar 11 of the spacer part 4 moves with screwing action into an abutment position against the component 2. The resilient force of the counter stop 20 is less than the frictional force of the resilient tongue 9 on the threaded shank of the connecting screw 5.

The exemplary embodiments illustrated in FIGS. 11 to 14 each have two constituent parts, namely the supporting part 3 and the spacer part 4, which are produced as plastics injection mouldings. FIG. 11 shows a sectional illustration of the two injection mouldings in the screwed-together state. The supporting part 3 has a threaded bushing 6, which has a collar 10 integrally formed on it. This collar 10, in turn, has the fastening tongues 8 integrally formed on it. The threaded bushing 6 has an internal thread 6'. The bushing wall 23, which is located opposite the internal thread 6', is smooth. The external thread 7' of the threaded bushing 7, which is formed by the spacer part 4, is screwed into the internal thread 6'. This threaded bushing 7 likewise has a collar 11 integrally formed on it from the same material. This collar forms the resilient tongues 9, which can position themselves with a friction fit against the thread turns of the fastening screw. The inner wall 24 of the threaded sleeve 7, this inner wall being located opposite the external thread 7', is smooth.

The exemplary embodiment illustrated in FIG. 12 has a continuous internal thread in the circumferential direction.

FIG. 13 shows a variant of a supporting part 3. In this case, the internal thread 6' is interrupted in the circumferential direction. A total of four thread-free zones 6" distributed uniformly in the circumferential direction are provided. These thread-free zones 6" extend in the axial direction of the threaded bushing 6.

Whereas, in the exemplary embodiment illustrated in FIG. 11, the resilient tongues 9 are associated with the collar 11, in the exemplary embodiment according to FIG. 14 the resilient tongues 9 are associated with the base of the threaded bushing 7 of the spacer part 4.

It is also possible to assign the resilient tongues to the base in the case of the deep-drawn parts described above. In particular, it is possible in this case for the resilient tongues 9 to be produced by punching out of the base opening. This can take place, in the simplest case, in that the closed base is provided with a cross-like incision, so that resilient lugs bend out as the connecting screw 5 is fitted through for the first time.

In an exemplary embodiment which is not illustrated, it is provided that the threaded bushing 6 of the supporting part is sheathed with plastics on the outside. This not only gives the supporting part 3 a more pleasant appearance, but also contributes to stabilization. Analogously, it is possible for the inside of the threaded bushing 7 of the spacer part 4 likewise to be provided with a plastics sleeve, through which the connecting screw 5 can be screwed.

In a further exemplary embodiment which is not illustrated, it is provided that the threaded bushings 6, 7 contain right-handed threads. It is then possible for the connecting screw to be fitted through from the other side. The spacer part is then carried along in the screwing-in direction.

I claim:

1. Device for bracing connection of spaced-apart components (1, 2) by a connecting screw (5), comprising a supporting part (3), which is securable on the first component (1) by means of fastening elements (8), and a spacer part (4), which is displaceable axially in relation to the supporting part (3) by rotation and, as the connecting screw (5), fitted into an opening of the spacer part, is screwed in, is carried along, as a result of friction-fitting engagement of lateral surface of a shank of the screw against resilient elements (9) projecting into the opening, until it strikes against the second component (2), both the supporting part (3) and the spacer part (4) being threaded bushings (6, 7) formed in one piece, and the fastening elements (8) and the resilient elements (9) forming parts of a respective shaped member, wherein
   the fastening elements (8) and the resilient elements (9) are formed by cut-out tongues of the respective shaped member, and
   the supporting part (3) and spacer part (4) each form, on a border of the bushing, a supporting surface formed by an outwardly projecting annular collar (10, 11).

2. Device according to claim 1, wherein the resilient elements (9) are cut out of an, in particular, thread-free bushing section (13) adjoining the annular collar (11).

3. Device for bracing connection of spaced-apart components (1, 2) by a connecting screw (5), comprising a supporting part (3), which is securable on the first component (1) by means of fastening elements (8), and a spacer part (4), which is displaceable axially in relation to the supporting part (3) by rotation and, as the connecting screw (5), fitted into an opening of the spacer part, is screwed in, is carried along, as a result of friction-fitting engagement of lateral surface of a shank of the screw against resilient elements (9) projecting into the opening, until it strikes against the second component (2), both the supporting part (3) and the spacer part (4) being threaded bushings (6, 7) formed in one piece, and the fastening elements (8) and the resilient elements (9) forming parts of a respective shaped member, wherein
   the fastening elements (8) and the resilient elements (9) are formed by cut-out tongues of the respective shaped member, and
   the fastening elements (8) are cut out of an annular collar (10) from the outside.

4. Device according to claim 3, wherein said spacer part further includes an annular collar (11) and the resilient elements (9) are cut out of an, in particular, thread-free bushing section (13) adjoining the annular collar (11).

5. Device for bracing connection of spaced-apart components (1, 2) by a connecting screw (5), comprising a supporting part (3), which is securable on the first component (1) by means of fastening elements (8), and a spacer part (4), which is displaceable axially in relation to the supporting part (3) by rotation and, as the connecting screw (5), fitted into an opening of the spacer part, is screwed in, is carried along, as a result of friction-fitting engagement of lateral surface of a shank of the screw against resilient elements (9) projecting into the opening, until it strikes against the second component (2), both the supporting part (3) and the spacer part (4) being threaded bushings (6, 7) formed in one piece, and the fastening elements (8) and the resilient elements (9) forming parts of a respective shaped member, wherein
   the fastening element is formed as a clip (15) having a counter plate (15) which is spaced apart from, and parallel to, a collar (10) of the supporting part (3) and has a through-passage opening (16) for the connecting screw.

6. Device according to claim 5, wherein the through-passage opening (16) for the connecting screw forms a neck (17).

7. Device for bracing connection of spaced-apart components (1, 2) by a connecting screw (5), comprising a supporting part (3), which is securable on the first component (1) by means of fastening elements (8), and a spacer part (4), which is displaceable axially in relation to the supporting part (3) by rotation and, as the connecting screw (5), fitted into an opening of the spacer part, is screwed in, is carried along, as a result of friction-fitting engagement of lateral surface of a shank of the screw against resilient elements (9) projecting into the opening, until it strikes against the second component (2), both the supporting part (3) and the spacer part (4) being threaded bushings (6, 7) formed in one piece, and the fastening elements (8) and the resilient elements (9) forming parts of a respective shaped member, wherein
   the fastening elements (8) and the resilient elements (9) are formed by cut-out tongues of the respective shaped member, and
   further comprising a stop lug (19) which projects from the threaded bushing (6) of the supporting part (3) and interacts with a counter stop (20) which is cut out of a collar (11) of the spacer part (4).

* * * * *